US011277043B2

(12) United States Patent
Ma

(10) Patent No.: US 11,277,043 B2
(45) Date of Patent: Mar. 15, 2022

(54) WINDING STRUCTURE OF ELECTRICAL MACHINE, MAGNETIC CONDUCTIVE MEMBER OF ELECTRICAL MACHINE, FERROMAGNETIC LAMINATION AND ELECTRICAL MACHINE

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 707 days.

(21) Appl. No.: 16/090,662

(22) PCT Filed: Feb. 24, 2018

(86) PCT No.: PCT/CN2018/077124
§ 371 (c)(1),
(2) Date: Oct. 2, 2018

(87) PCT Pub. No.: WO2019/033739
PCT Pub. Date: Feb. 21, 2019

(65) Prior Publication Data
US 2021/0218292 A1    Jul. 15, 2021

(30) Foreign Application Priority Data
Aug. 16, 2017   (CN) .......................... 201710703559.4

(51) Int. Cl.
*H02K 1/16*    (2006.01)
*H02K 1/26*    (2006.01)
(Continued)

(52) U.S. Cl.
CPC ............. *H02K 1/165* (2013.01); *H02K 1/265* (2013.01); *H02K 3/345* (2013.01); *H02K 3/487* (2013.01);
(Continued)

(58) Field of Classification Search
CPC ........ H02K 1/165; H02K 1/265; H02K 3/345; H02K 3/487; H02K 7/183; F03D 9/25; F05B 2220/706
(Continued)

(56) References Cited

U.S. PATENT DOCUMENTS

2006/0218777 A1* 10/2006 Swift ..................... H02K 41/02
29/605
2011/0284150 A1    11/2011 Schibsbye
(Continued)

FOREIGN PATENT DOCUMENTS

CN    1022448687 A    11/2011
CN    202524177 U    11/2012
(Continued)

OTHER PUBLICATIONS

Extended European Search Report dated Jul. 19, 2019; Appln. No. 18781942.9.
(Continued)

*Primary Examiner* — Michael Andrews

(57) ABSTRACT

A ferromagnetic lamination, a magnetic conductive member of an electrical machine, an electrical machine having the magnetic conductive member of the electrical machine, a winding structure of an electrical machine, an electrical machine having the winding structure of the electrical machine, and an electric energy and magnetic energy conversion device are provided. The magnetic conductive member of the electrical machine includes winding slots, and multiple cavities are formed on an inner wall of each of the
(Continued)

winding slots. With the magnetic conductive member of the electrical machine, a liquid insulating medium can be effectively retained and fixed by means of a cavity structure when an insulating treatment is performed on the magnetic conductive member of the electrical machine, and a rooted intermediate elastic base is formed at a ferromagnetic boundary after the liquid insulating medium is solidified, thereby effectively preventing the insulating medium from peeling, splitting or falling off.

16 Claims, 12 Drawing Sheets

(51) Int. Cl.
  *H02K 3/34* (2006.01)
  *H02K 3/487* (2006.01)
  *H02K 7/18* (2006.01)
  *F03D 9/25* (2016.01)
(52) U.S. Cl.
  CPC .............. *H02K 7/183* (2013.01); *F03D 9/25* (2016.05); *F05B 2220/706* (2013.01)
(58) Field of Classification Search
  USPC ........................................................ 310/214
  See application file for complete search history.

(56) References Cited

U.S. PATENT DOCUMENTS

| | | | |
|---|---|---|---|
| 2013/0061641 | A1 | 3/2013 | Yoon et al. |
| 2014/0300243 | A1 | 10/2014 | Berkouk et al. |
| 2014/0348673 | A1 | 11/2014 | Tamamura et al. |
| 2016/0006302 | A1 | 1/2016 | Gugel et al. |
| 2016/0211733 | A1* | 7/2016 | Hattori .................. H02K 15/10 |
| 2017/0141653 | A1* | 5/2017 | Okazaki ................. H02K 3/18 |
| 2017/0310186 | A1 | 10/2017 | Wang et al. |
| 2017/0324295 | A1* | 11/2017 | Tomonaga ............ H02K 3/522 |

FOREIGN PATENT DOCUMENTS

| | | |
|---|---|---|
| CN | 103001358 A | 3/2013 |
| CN | 103904794 A | 7/2014 |
| CN | 104184226 A | 12/2014 |
| CN | 104011975 B | 10/2016 |
| CN | 107482800 A | 12/2017 |
| DE | 19743430 A1 | 12/1998 |
| EP | 2975734 A2 | 1/2016 |
| GB | 2406001 A | 3/2005 |
| JP | 2007-209163 A | 8/2007 |
| JP | 2015-136241 A | 7/2015 |
| WO | 2016/054862 A1 | 4/2016 |

OTHER PUBLICATIONS

International Search Report dated May 18, 2018; PCT/CN2018/077124.

* cited by examiner

WINDING STRUCTURE OF ELECTRICAL MACHINE, MAGNETIC CONDUCTIVE MEMBER OF ELECTRICAL MACHINE, FERROMAGNETIC LAMINATION AND ELECTRICAL MACHINE

The present application is the national phase of International Application No. PCT/CN2018/077124, titled "WINDING STRUCTURE OF ELECTRICAL MACHINE, MAGNETIC CONDUCTIVE MEMBER OF ELECTRICAL MACHINE, FERROMAGNETIC LAMINATION AND ELECTRICAL MACHINE", filed on Feb. 24, 2018, which claims the priority to Chinese Patent Application No. 201710703559.4 titled "WINDING STRUCTURE OF ELECTRICAL MACHINE, MAGNETIC CONDUCTIVE MEMBER OF ELECTRICAL MACHINE, FERROMAGNETIC LAMINATION AND ELECTRICAL MACHINE", filed on Aug. 16, 2017 with the State Intellectual Property Office of the People's Republic of China, the entire disclosures of which applications are incorporated herein by reference.

FIELD

The present application relates to the technical field of electrical machines, and in particular to a ferromagnetic lamination used for manufacturing a magnetic conductive member of an electrical machine, a magnetic conductive member of the electrical machine formed by the ferromagnetic lamination, a winding structure of an electrical machine, an electrical machine having the winding structure of the electrical machine, and an electric energy and magnetic energy conversion device.

BACKGROUND

A wind turbine generator system is a large power generation device that converts wind energy into electric energy. As a core component of the wind turbine generator system, an electrical machine includes a rotor and a stator, and the stator includes a stator core and a winding wound on the stator core. In the manufacturing process of the electrical machine, a winding slot is required to be opened on a magnetic conductive member of an electrical machine, and a coil winding is required to be arranged in the winding slot. The coil winding is fixed in the winding slot by providing various shapes of slot wedges at a slot opening. In practice, the magnetic conductive member of the electrical machine is generally formed by superposing multiple ferromagnetic laminations each having a tooth slot on each other.

For example, the magnetic conductive member of the electrical machine is a stator core, FIG. 1 and FIG. 2 show schematic views of a partial structure of a stator winding, FIG. 3 shows a perspective view of a partial structure of the stator winding, FIG. 4 shows a schematic axial view of a tooth slot 31 of a ferromagnetic lamination 30, and FIG. 5 shows an axial sectional view of the ferromagnetic lamination 30 filled with a coil winding 200. As shown in FIGS. 1 to 5, taking an inner stator as an example, after the ferromagnetic laminations 30 are superposed to form the stator core 10, winding slots 11 for accommodating the coil winding are formed on the outer circumference of the stator core 10. The inner edge of the tooth slot 31 of each ferromagnetic lamination 30 is substantially linear, and after the multiple ferromagnetic laminations 30 are superposed on each other, the inner wall of the winding slot 11 formed by the tooth slots 31 of the ferromagnetic laminations 30 is a substantially flat surface. The coil winding 200 is fixed in the winding slots 11, and slot wedges 300 are provided at slot openings of the winding slots 11 to fix the coil winding 200 in the winding slots 11. As shown in FIGS. 3 and 4, the stator core 10 serves as the magnetic conductive member of the electrical machine, the inner periphery of the winding slot 11 is a ferromagnetic boundary. After a stator winding member is formed by winding the coil winding 200 in the winding slots 11, fine gaps are provided between edges of the ferromagnetic laminations 30 superposed on each other, a certain gap is provided between the ferromagnetic boundary and the coil winding 11, a certain gap is also provided between the coil winding 11 and the slot wedge 300, and between the slot wedge 300 and the inner edge of the slot opening, and a certain gap is also provided inside the coil winding 11. These gaps in the stator winding become hidden dangers of water entry and moisture adsorption which damage the insulation.

In order to improve the protection performance of the stator winding, an impregnation treatment is generally performed on the stator winding, and the gaps in the stator winding are filled with insulating varnish or insulating glue. A varnish impregnation treatment is commonly used in the impregnation treatment for the insulation treatment of an electrical machine stator. The currently used varnish impregnation treatment process is double varnish impregnation in a thermal immersion process. The varnish impregnation process generally includes: pre-baking, first varnish impregnation, varnish dripping, first drying, second varnish impregnation, varnish dripping, and second drying. The insulating varnish can fill the inner gaps of the stator winding and cover the surface of the coil winding by the varnish impregnation treatment. However, even after the varnish impregnation treatment, there are still some gaps in the stator winding. Therefore, the stator winding after the varnish impregnation treatment is like a porous insulating material.

In the varnish impregnation process, the insulating varnish is expected to penetrate into the gaps of the stator iron core better and more fully, to reduce gaps in the stator winding as much as possible. In the varnish dripping process, the least possible insulating varnish is expected to flow out from the stator iron core as little as possible. The viscosity of the insulating varnish directly affects that whether the insulating varnish can easily penetrate into the gaps of the stator winding and whether the insulating varnish can easily flow out from the stator winding.

The viscosity of the varnish is related to an amount of solvent in the varnish. The more the solvent, the less the solid content, and the lower the viscosity of the varnish. In a case where low-viscosity varnish is used, although the varnish has strong penetration ability and can penetrate well into the gaps of the stator winding, due to the small vanish content, there are still many gaps left after the solvent volatilizes. In addition, much varnish flows out in the varnish dripping process, which affects the moisture resistance, thermal conductivity, mechanical strength and dielectric strength of the stator winding. In a case where the varnish having a too high viscosity is used, the varnish can hardly penetrate into the inside of the winding, that is, a phenomenon of "impermeable" occurs, and similarly, the moisture resistance, thermal conductivity, mechanical strength and dielectric strength of the stator winding cannot meet the requirements.

In general, the traditional ferromagnetic lamination structure is beneficial to the entry of varnish, but cannot prevent the loss of varnish. Therefore, although advanced impregnation processes (such as vacuum pressure impregnation (VPI) and the like) are adopted during the production process of the electrical machine, "bubbles" or "air gaps" are inevitably generated in a winding of the electrical machine, especially at an insulation boundary of an electromagnetic wire (ferromagnetic boundary). On one hand, hidden dangers of water entry and moisture adsorption which damage the insulation are caused by the "bubbles" or "air gaps"; on the other hand, partial discharge may occur at the "bubbles" or "air gaps". The discharge may damage the structure of a polymeric insulating material in the wires, which may result in cracking, local melting and chemical degradation, thereby producing H and O to corrode the insulating material to form "micro holes". Under the action of an acid, an alkali, and the moisture, the insulation layers are is "wet to swell up" and "soaked to swell up", which causes the insulation layers to age, meanwhile, the moisture gasifies and condenses in the thermal cycle, larger "gaps" are formed, which results in the separation and peeling of the insulating layers of the wires, thereby causing a short circuit between the wires.

In addition, under the strong magnetic field of the electrical machine, when the water entering the air gap of the electrical machine is magnetized, the bonding state between water molecules is changed from a long chain to a short chain, so that the water easily penetrates into fine gaps between hard ferromagnetic laminations, which promotes a capillary phenomenon between the laminations, thus the water penetrates into the porous insulating materials after the vacuum pressure impregnation more easily to rust the ferromagnetic laminations.

In conclusion, the conventional stator winding has both advantages and disadvantages in the varnish impregnation process. Since the ferromagnetic boundary (an in-slot edge of a lamination iron core) is a substantially flat surface, the ferromagnetic boundary structure facilitates the entry of the insulating varnish during the varnish impregnation process, but cannot prevent the loss of the insulating varnish during the varnish dripping process. Especially during the varnish dripping process, the insulating varnish not only flows out from the slot opening (slot wedge) in the radial direction, but also flows out from both axial ends of the winding slot in the axial direction. Therefore, a small amount of varnish having a thin thickness is applied in the stator winding, particularly on the surface of the ferromagnetic boundary. Further, at the slot opening portion, a tight sealing ring can hardly be formed at the outer periphery of the slot wedge.

In addition, in the case where the slot wedge 300 is used to fix the in-slot coil 200 in the conventional technology, since the ferromagnetic lamination and the conventional slot wedge are made of completely different materials, the elastic moduli of the ferromagnetic laminations are greatly different, a "debonding" phenomenon may occur at the bonding layer interface formed between a free end of the conventional slot wedge and a slot opening tooth sheet of the ferromagnetic lamination with the help of the insulting medium, resulting in that a gap is formed between the slot wedge and a slot opening tooth sheet of the iron core, and the moisture and water naturally enter the winding slot along the gap where the "debonding" phenomenon occurs to damage the insulation. Even if the slot wedge is made of a magnetic conductive material, the firmness of the bonding layer interface between the slot wedge and the slot opening tooth sheet of the iron core cannot be ensured, and the moisture and water cannot be prevented from naturally entering the winding slot along the gap where the bonding layer cracks to damage the insulation.

Therefore, the traditional winding of the electrical machine cannot effectively ensure the insulation performance and service life of the stator winding.

SUMMARY

An object of the present application is to provide a ferromagnetic lamination having an improved structure, a magnetic conductive member of an electrical machine formed by the ferromagnetic lamination, a winding structure of the electrical machine, and an electrical machine having the magnetic conductive member of the electrical machine or the winding structure of the electrical machine.

According to an aspect of the present application, a winding structure of the electrical machine is provided. The winding structure of the electrical machine includes a magnetic conductive member of the electrical machine and a coil winding. The magnetic conductive member of the electrical machine has multiple winding slots; the coil winding is arranged in the winding slots; multiple cavities opening toward the inside of the each of the winding slots are formed in an inner wall of the winding slot, and a filling medium is filled in the cavities and between the winding slot and the coil winding.

According to an aspect of the present application, an electrical machine is provided. The electrical machine includes the winding structure of the electrical machine described above.

According to another aspect of the present application, a magnetic conductive member of the electrical machine is provided. The magnetic conductive member of the electrical machine includes winding slots. Multiple cavities in communication with each of the winding slots are formed in an inner wall of the winding slot.

According to another aspect of the present application, an electrical machine is provided. The electrical machine includes the magnetic conductive member of the electrical machine described above.

According to still another aspect of the present application, a ferromagnetic lamination is provided. Multiple grooves are provided at a ferromagnetic boundary, where a tooth slot is formed, of the ferromagnetic lamination, and the multiple grooves are in communication with the tooth slot.

According to still another aspect of the present application, an electrical machine is provided. The electrical machine includes a magnetic conductive member of the electrical machine formed by the ferromagnetic lamination described above.

According to yet another aspect of the present application, an electric energy and magnetic energy conversion device is further provided. The electric energy and magnetic energy conversion device includes an electrically conductive member, an insulator and a magnetic conductive member. The electrically conductive member is arranged on the magnetic conductive member; the insulator is formed between the magnetic conductive member and the electrically conductive member. Multiple cavities are formed on a boundary, corresponding to the electrically conductive member, of the magnetic conductive member, and the insulator is filled in both the multiple cavities and a gap between the electrically conductive member and the magnetic conductive member other than the multiple cavities.

With the magnetic conductive member of the electrical machine, the winding structure of the electrical machine, and the electrical machine according to the present application, a liquid insulating medium can be effectively retained and fixed by means of a cavity structure when an insulating treatment is performed on the magnetic conductive member of the electrical machine, and a rooted intermediate elastic base is formed at the ferromagnetic boundary after the liquid insulating medium is solidified, thereby effectively preventing the insulating medium from peeling, splitting or falling off.

The present application makes a breakthrough in the understanding of the existing structure, and improves the structure of the ferromagnetic boundary of the conventional winding based on that a traditional winding lamination iron core structure is used for the magnetic conductive function in the winding of the electrical machine, to form a new type of boundary structure solidified and bonded with the insulating medium at the ferromagnetic boundary of an insulating structure of the winding of the electrical machine, which prevents water and moisture from entering into the junction between the ferromagnetic boundary and the insulating medium to damage the insulating structure. After the liquid insulating medium between the ferromagnetic boundary and the winding of the electrical machine is filled and solidified at the boundary, the insulating medium is rooted in the cavities at the ferromagnetic boundary, the adjacent insulating medium is bonded to form an intermediate elastic base (bonding base), and an elastic sealing structure with a base is formed at the slot wedge and the slot opening of the magnetic conductive member. With the special boundary structure, the insulating medium can be prevented from flowing out in the radial and axial directions of the ferromagnetic boundary during the varnish dripping process and rotary baking process after the varnish impregnation in the vacuum pressure impregnation process, thereby improving a fullness rate of the insulating medium filling and impregnation after the varnish impregnation. With the intermediate elastic sealing structure, the filling amount of the insulating medium can be increased and locked, the ability of the boundary to prevent the intrusion of the moisture and other mediums can be improved, so that oxygen, moisture and water in the air cannot easily enter into an interior of the insulating structure, thereby delaying the aging of the insulation system, reducing the risk of the moisture and water entering into and being retained inside the electrical machine and improving the insulation reliability.

BRIEF DESCRIPTION OF THE DRAWINGS

The above and other objects and features of the present application will become more apparent from the following description given in conjunction with the drawings that exemplarily show an example. In the drawings.

REFERENCE NUMERALS IN THE FIGURES

Figure 1:
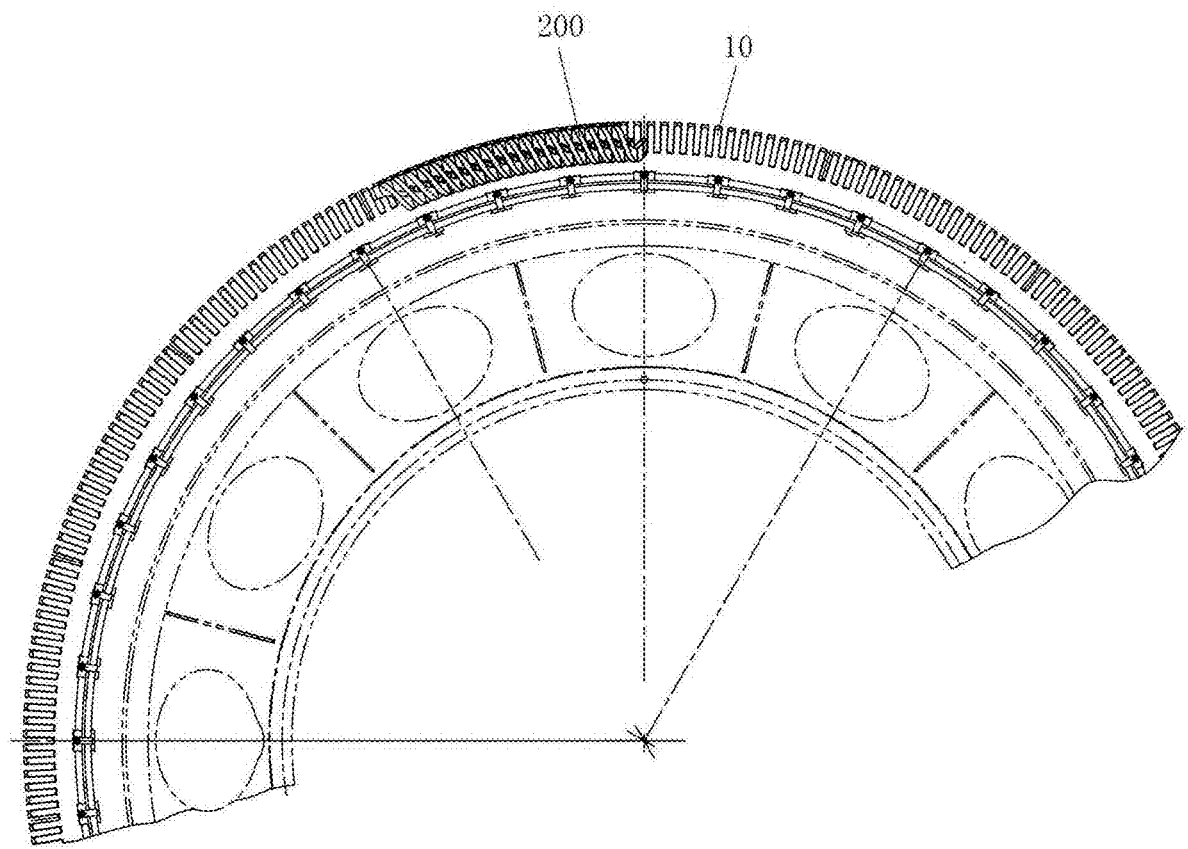
FIG. 1 and FIG. 2 show schematic views of a partial structure of a winding with a magnetic conductive member in a wind turbine generator system in the conventional technology.
Figure 2:
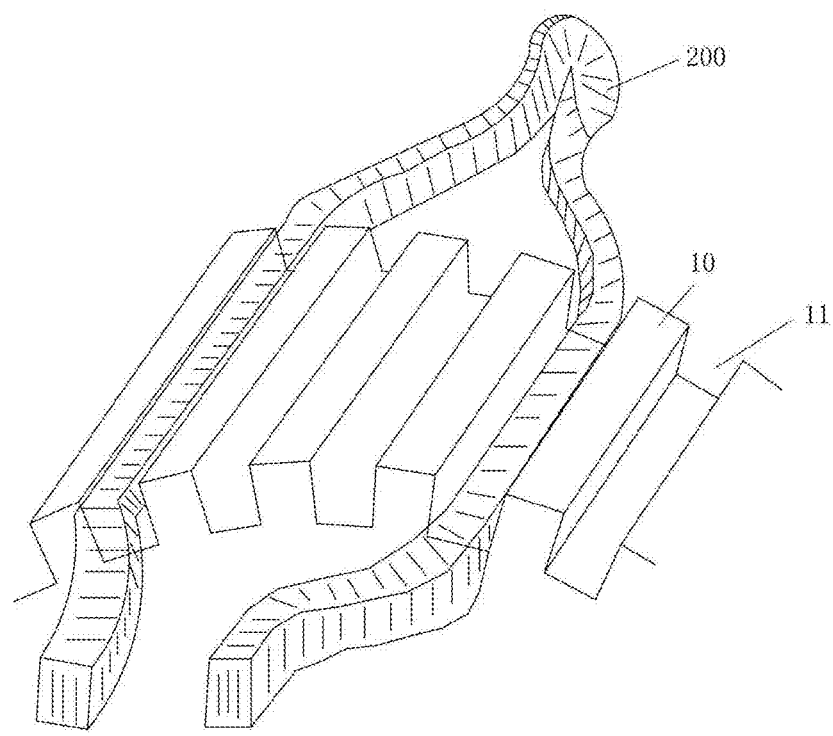
Figure 3:
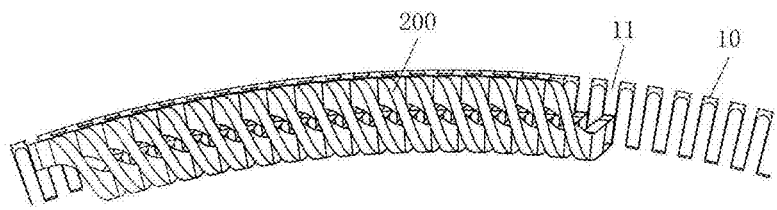
FIG. 3 shows a partial perspective view of the winding and the magnetic conductive member in the conventional technology.
Figure 4:
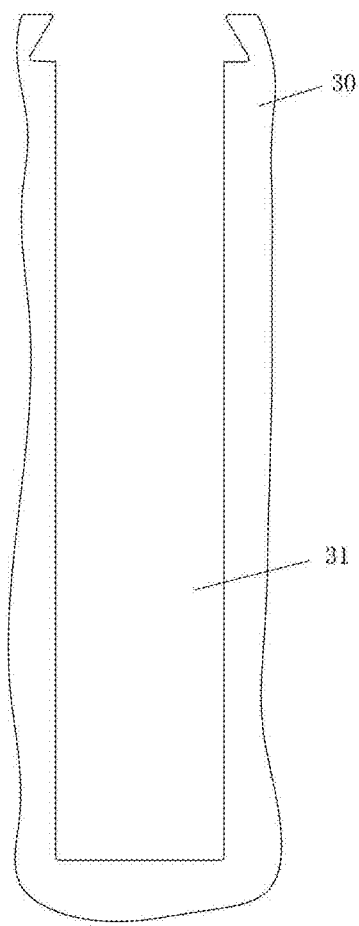
FIG. 4 shows a schematic axial view of a partial structure of a ferromagnetic lamination in the conventional technology.
Figure 5:
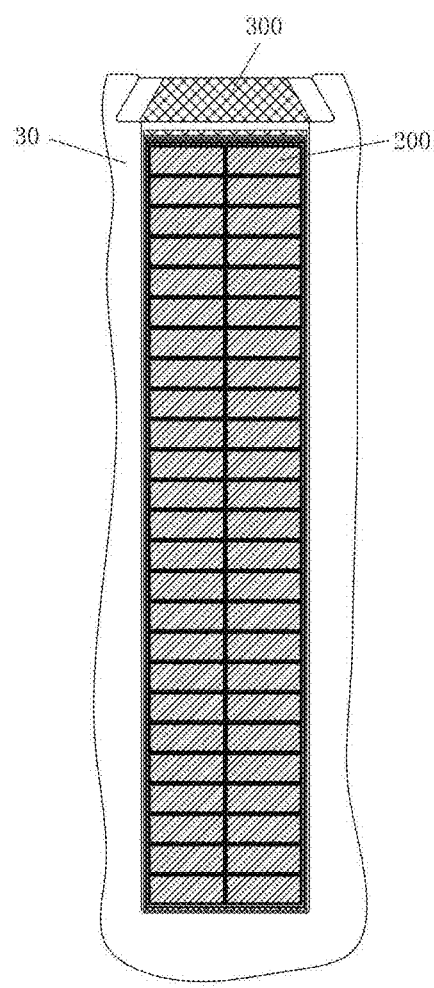
FIG. 5 shows an axial sectional view of a winding slot containing a coil winding in the conventional technology.

| | |
|---|---|
| 10 stator core, | 11 winding slot, |
| 30 ferromagnetic lamination, | 31 tooth slot, |
| 100 ferromagnetic lamination, | 110 winding slot, |
| 101 tooth slot, | 112 slot body portion, |
| 114 slot opening portion, | 118 ferromagnetic boundary, |
| 120 groove, | 200 coil winding, |
| 300 slot wedge, | 400 cavity, |
| 410, 420 insulating medium, | 500 vacuum space, |
| 900 rotating shaft. | |

DETAILED DESCRIPTION OF EMBODIMENTS

In order to solve the problems in the conventional technology that, a liquid insulating medium is not easily retained in a magnetic conductive member of an electrical machine during an insulation process of the magnetic conductive member of the electrical machine, and an insulating medium layer is squeezed or stretched to peel from a surface of the magnetic conductive member or split when the magnetic conductive member of the electrical machine is deformed due to thermal expansion and contraction caused by temperature changes. The present application improves the structure of a ferromagnetic boundary of the conventional winding from the angle of an interdisciplinary seepage mechanics, to form a new type of boundary structure, i.e., a cavity structure on the ferromagnetic boundary, and a vacuum space can be automatically formed in a cavity, to automatically prevent the liquid insulating medium from flowing out, and thus retaining and fixing the liquid insulating medium. Further, after the liquid insulating medium is solidified and molded, a rooted three-dimensional bonding force network is formed between the ferromagnetic boundary of the insulating structure and the insulating medium, to prevent the insulating medium layer from peeling from the ferromagnetic boundary or splitting. In this way, an elastic sealing structure with a base is formed at the slot opening portion, thereby preventing "debonding" at a bonding layer interface. With this structure, oxygen, moisture and water in the air are prevented from entering into an interior of the insulating structure, thereby delaying the aging of an insulating system, and improving the insulation reliability.

Hereinafter, embodiments of the present application are described in detail with reference to the drawings. Throughout this specification, the same parts are indicated by the same or similar reference numerals.

Figure 6:
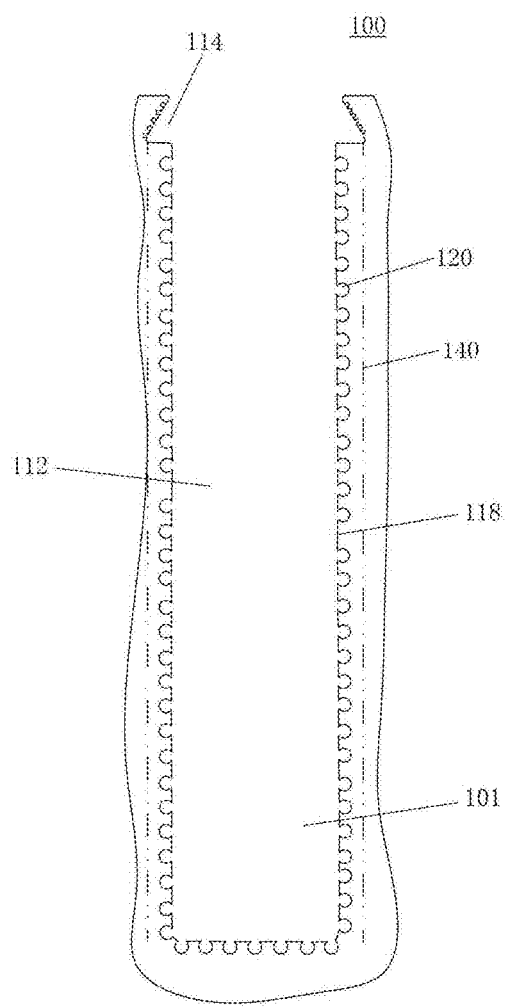
FIG. 6 shows a schematic view of the structure of one ferromagnetic lamination used for manufacturing a magnetic conductive member of an electrical machine according to an embodiment of the present application.

FIG. 6 shows a schematic view of the structure of a ferromagnetic lamination used for manufacturing a magnetic conductive member of the electrical machine according to an exemplary embodiment of the present application.

Figure 8:
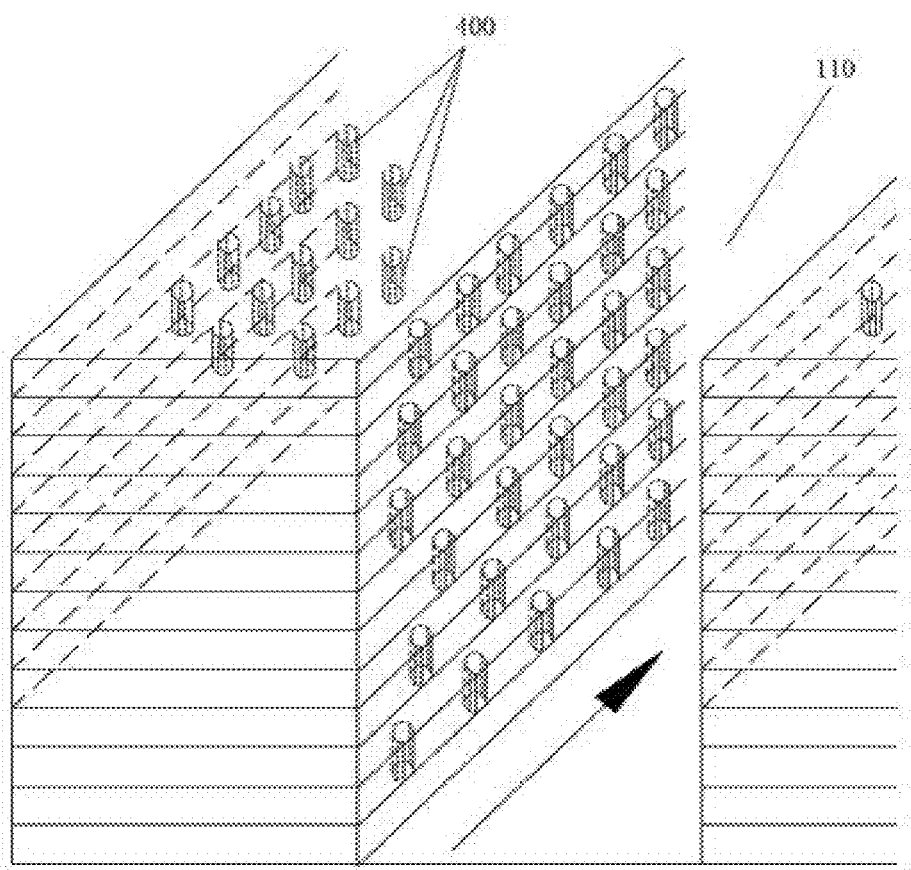
FIG. 8 shows a perspective view of a partial structure of a magnetic conductive member of the electrical machine according to an exemplary embodiment of the present application.

A ferromagnetic lamination 100 according to an embodiment of the present application may have multiple teeth and tooth slots 101 between adjacent teeth, these tooth slots 101 form a winding slot 110 (as shown in FIG. 8), used for accommodating a coil winding, of a magnetic conductive member of the electrical machine. FIG. 6 shows a schematic axial view of only one of the tooth slots 101. The tooth slot 101 may include a slot body portion 112 and a slot opening portion 114 in a radial direction. Portions of the coil winding 200 other than an end portion of the winding may be accommodated in the slot body portion 112, and a slot wedge 300 may be accommodated in the slot opening portion 114.

In the ferromagnetic lamination 100 according to the embodiment of the present application, multiple grooves 120 opening towards an in-slot space are formed on an inner edge of the tooth slot 101, that is, multiple grooves 120 in communication with the space defined by the tooth slot 101 are formed at a ferromagnetic boundary, where the tooth slot 101 is formed, of the ferromagnetic lamination 100. For one ferromagnetic lamination, the grooves 120 may be formed on the entire inner edge (the ferromagnetic boundary) of the tooth slot 101, including an inner edge of the slot body portion 112 and an inner edge of the slot opening portion 114. Optionally, the grooves 120 may also be formed only on a part of the inner edge of the tooth slot 101, for example, only on the inner edge of the slot body portion 112, or only on one of left and right sides of the slot body portion 112. For one ferromagnetic lamination, positions of the grooves 120 formed at the inner edge of the tooth slot 101 are not limited by the above description.

Figure 7:
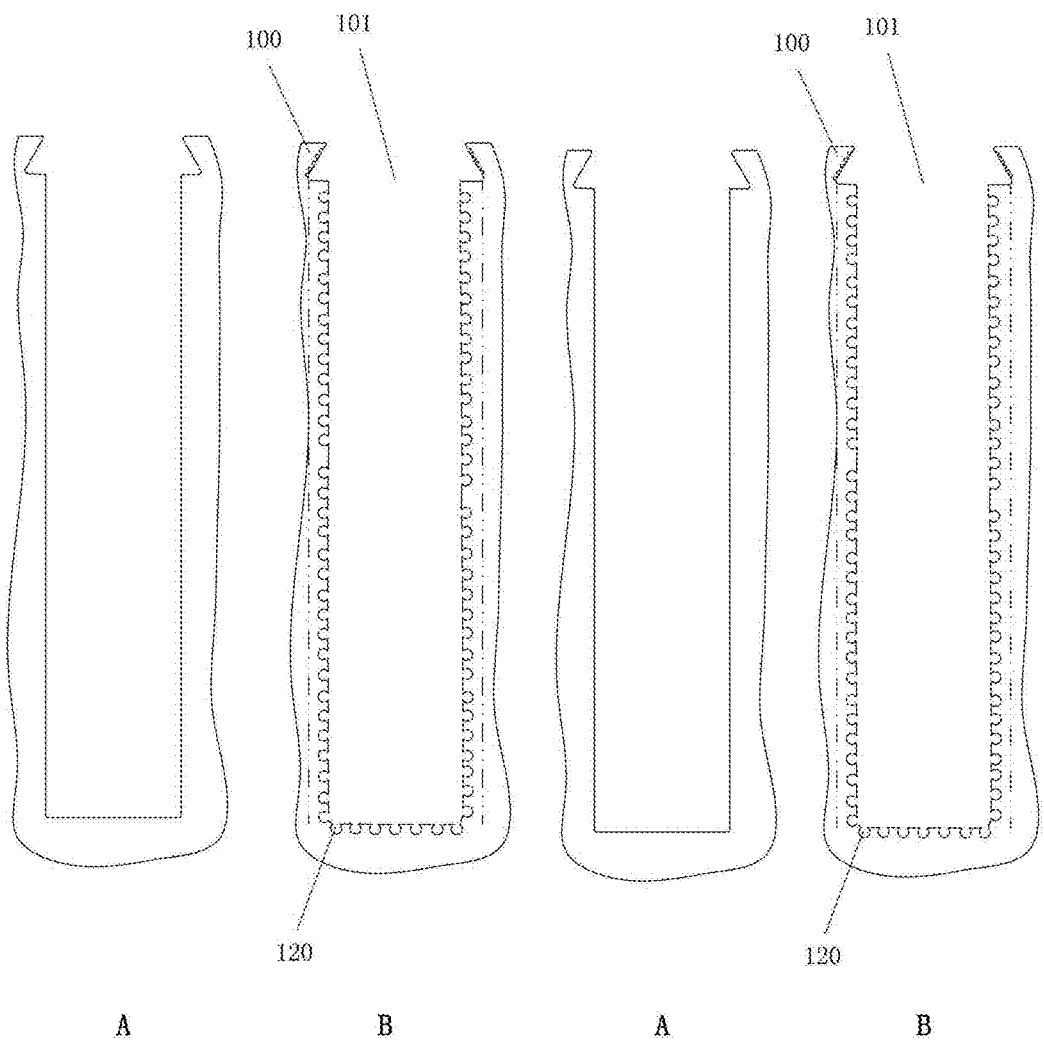
FIG. 7 shows a schematic view of multiple ferromagnetic laminations used for manufacturing a magnetic conductive member of the electrical machine according to a first embodiment of the present application.

The groove 120 may have a structure with a large body and a small opening in a direction facing the inside of the tooth slot 101, in other words, the groove 120 has a gradually contracted opening in the direction facing the inside of the tooth slot 101. Specifically, inner edges at two sides of the groove 120 may gradually and obliquely constrict towards an opening position thereof, so that a size of the groove 120 gradually decreases in the direction facing the inside of the tooth slot 101. By providing the opening of the groove 120 as a contracted opening, the liquid insulating medium in the groove 120 can be effectively prevented from flowing out. Preferably, the groove 120 may have a rough or curved inner edge to form a curved flow channel, so as to increase the flow resistance of the liquid insulating medium. For example, as shown in FIGS. 6 and 7, a junction between the inner edge of the groove 120 and the inner edge of the tooth slot 101 may be formed into a sharp protrusion structure.

According to the embodiment of the present application, the sizes of the grooves 120 may be the same, and the arrangement density of the grooves may be uniform for the same ferromagnetic lamination 100. As an example, the sizes of the grooves 120 at different positions of the tooth slot 101 are different. The size of the groove 120 may gradually increase and the size of the opening of the groove 120 may gradually decrease in a radial direction of an electrical machine stator, to obtain a large reaction force in a vacuum state for preventing loss of the liquid insulating medium, especially near the slot opening.

The slot opening portion 114 is used to accommodate the slot wedge 300, and therefore the maximum width of an accommodating space of the slot opening portion 114 is greater than the width of an accommodating space of the slot body portion 112. For the tooth slot, an effective region through which magnetic force lines pass is a region outside a widest portion of the slot opening portion 114, that is, an effective region between two adjacent tooth slots. In a case that a dashed line 140 is drawn from a widest position of the accommodating space of the slot opening portion 114 along an inner boundary parallel to the slot body portion 112, the portion outside the dashed line 140 is the effective region through which the magnetic force lines pass.

Therefore, in the ferromagnetic lamination 100 according to the embodiment of the present application, the grooves 120 are preferably formed between the dashed line 140 and the inner edge 118 (an outer outline or a boundary line of a flat region or straight region of the ferromagnetic boundary) of the tooth slot 101. That is, in a width direction of the tooth slot 101, the groove 120 does not exceed the outermost edge of the accommodating space of the slot opening portion 114, so as to maintain electromagnetic characteristics of the ferromagnetic boundary of the slot wedge as much as possible, thus avoiding the reduction of the ferromagnetic efficiency of the magnetic conductive member due to the grooves 120.

Multiple ferromagnetic laminations according to the present application may be superposed on each other to form a magnetic conductive member of the electrical machine. FIG. 7 shows an example of multiple ferromagnetic laminations used for manufacturing a magnetic conductive member of the electrical machine according to an embodiment of the present application. FIG. 8 shows a perspective view of a partial structure of a magnetic conductive member of the electrical machine according to an embodiment of the present application.

FIG. 7 shows only a topmost layer of ferromagnetic lamination, a second layer of ferromagnetic lamination, a third layer of ferromagnetic lamination, and a fourth layer of ferromagnetic lamination that form a magnetic conductive member of the electrical machine. The four layers of ferromagnetic laminations include two ferromagnetic laminations A and two ferromagnetic laminations B, the ferromagnetic laminations A and the ferromagnetic laminations B are alternately arranged and are superposed on each other in an axial direction. The first layer of ferromagnetic lamination A and the third layer of ferromagnetic lamination A may employ a ferromagnetic lamination in the conventional technology, in which no groove 120 is formed on an inner edge of a tooth slot. The second layer of ferromagnetic lamination B and the fourth layer of ferromagnetic lamination B employ a ferromagnetic lamination according to the exemplary embodiment of the present application, wherein multiple grooves 120 are formed on an inner edge of a tooth slot of the ferromagnetic lamination B. Although FIG. 7 shows only four layers of ferromagnetic laminations, it should be understood that more ferromagnetic laminations A and ferromagnetic laminations B may be superposed on each other in the same manner to form a magnetic conductive member of the electrical machine.

After the multiple ferromagnetic laminations described above are superposed on each other, the magnetic conductive member of the electrical machine shown in FIG. 8 is formed. FIG. 8 shows a perspective view of a partial structure of a ferromagnetic boundary at two sides of the winding slot 110 of the magnetic conductive member of the electrical machine, and an arrow in FIG. 8 indicates a slot depth direction. For the electrical machine stator, the slot depth direction is also the radial direction.

As shown in FIG. 8, ferromagnetic laminations A may be employed on odd layers and ferromagnetic laminations B may be employed on even layers. In a case where the ferromagnetic laminations A and the ferromagnetic laminations B are alternately superposed, upper and lower sides (i.e., both sides in a thickness direction) of the groove 120 on the ferromagnetic lamination B are covered by adjacent ferromagnetic laminations A. In this case, the groove 120 can open only towards an in-slot direction, so as to form a cavity 400. In this way, multiple cavities 400 are formed on the inner boundary (ferromagnetic boundary) of the winding slot 110. Correspondingly, similar to the groove 120, the cavity 400 also has a structure with a large body and a small opening.

Since a large number of cavities 400 are formed in the inner wall of the winding slot 110 of the magnetic conductive member of the electrical machine shown in FIG. 8, the inner wall of the winding slot 110 is no longer a relatively flat planar structure, so that more liquid insulating medium flows into the cavities 400 and are adsorbed on the ferromagnetic boundary in the varnish impregnation process, and more insulating medium is retained in gaps among the winding, the magnetic conductive member, and the slot wedges in the varnish dripping process.

In the example shown in FIG. 8, the ferromagnetic laminations B are arranged on even layers. Apparently, the ferromagnetic laminations B may also be arranged on odd layers, to form cavities 400 in the odd layers of the magnetic conductive member of the electrical machine.

Although FIG. 7 shows two types of ferromagnetic laminations A and B and FIG. 8 shows a magnetic conductive member of the electrical machine made of the two types of ferromagnetic laminations A and B, the present application is not limited thereto. The ferromagnetic laminations may have a wide variety of types, so that cavities in the inner wall of the winding slot 110 of the formed magnetic conductive member of the electrical machine may be distributed in various manners. For example, some grooves 120 may be formed at a left side of the tooth slot 101 of the ferromagnetic lamination A, and other grooves 120 may be formed at a right side of the tooth slot 101 of the ferromagnetic lamination B, so that some cavities 400 are formed in odd layers at one side of the winding slot 110 of the magnetic conductive member of the electrical machine, and other cavities 400 are formed on even layers at the other side of the winding slot 110. In addition, it is not necessary to manufacture the ferromagnetic laminations in such a manner that there are grooves 120 formed on one side of the winding slot 110 and there is no groove 120 formed on the other side of the winding slot 110, as long as an upper side and a lower side of the groove 120 on a ferromagnetic lamination are covered by adjacent ferromagnetic laminations so that cavities 400 can be formed in the inner wall of the winding slot 110 of the magnetic conductive member. For example, grooves 120 may be alternatively formed at different positions of adjacent two layers of ferromagnetic laminations, thereby forming cavities 400 in both odd and even layers of the magnetic conductive member of the electrical machine.

In addition, in a case where a size of a cavity 400 formed by using a groove 120 in a single layer of ferromagnetic lamination cannot meet design requirements, at least two ferromagnetic laminations having the grooves 120 at the same position may be adjacently superposed to form a larger cavity. Therefore, each of the cavities 400 may be formed on one layer of ferromagnetic lamination or at least two layers of ferromagnetic laminations.

Therefore, with the magnetic conductive member according to the embodiment of the present application, the technical effects can be achieved, as long as multiple cavities 400 are formed in the inner wall of the winding slot 110, regardless of whether each of the cavities is formed on a respective layer of ferromagnetic lamination and whether the multiple cavities 400 are arranged according to the odd layers or even layers, or whether each of the cavities is formed across layers.

Although the magnetic conductive member of the electrical machine is formed by superposing multiple ferromagnetic laminations according to the example of the present application, it should be easily understood by those skilled in the art that, in a case where the magnetic conductive member of the electrical machine is integrally cast rather than being formed by superposing multiple ferromagnetic laminations, the cavities 400 may also be formed directly in the inner wall of the winding slot.

The mechanism by which the cavity structure in the magnetic conductive member of the electrical machine according to the embodiment of the present application prevents the loss of the liquid insulating medium is described in detail below with reference to the drawings.

Figure 9:
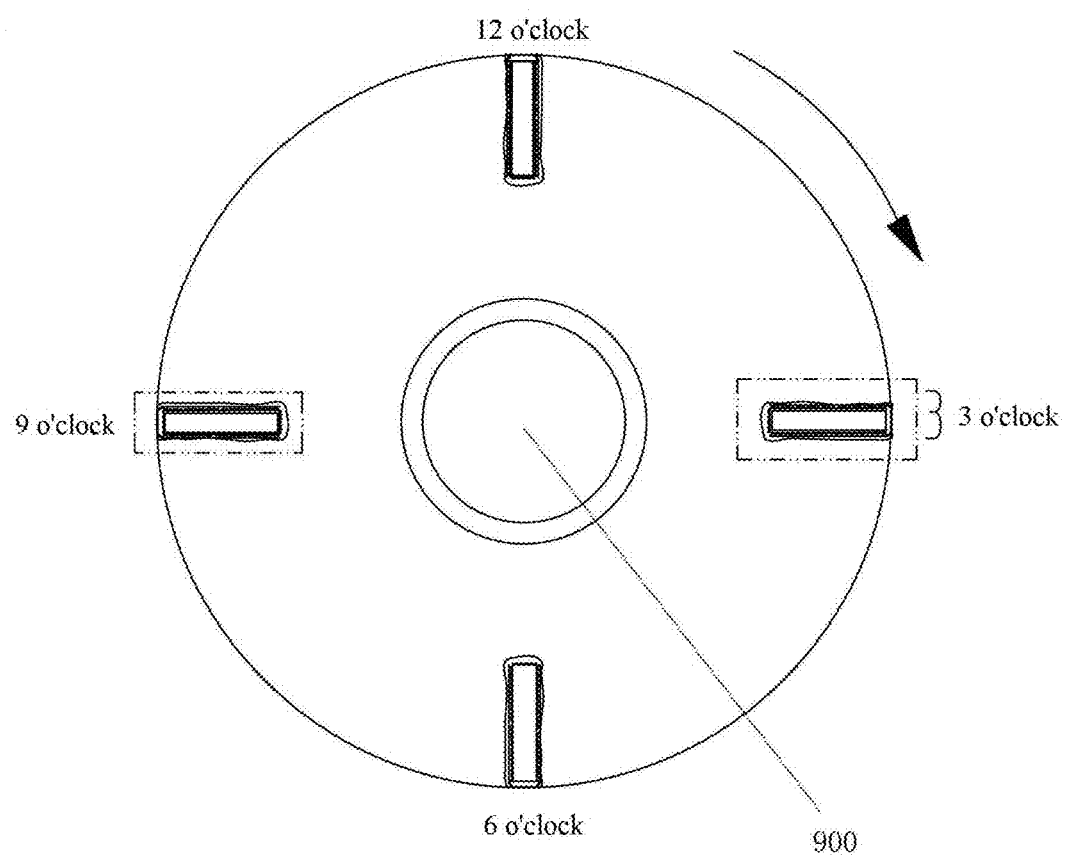
FIG. 9 shows a schematic view of a rotary drying process of a magnetic conductive member of the electrical machine after varnish impregnation.

FIG. 9 shows a schematic view of a rotary baking process of the magnetic conductive member of the electrical machine according to the embodiment of the present application. In this example, the magnetic conductive member is a stator of the electrical machine having an inner stator and an outer rotor. Therefore, the winding slot 110 is provided at an outer periphery of the stator.

After the coil winding is wound on the magnetic conductive member of the electrical machine according to the embodiment of the present application, an insulation treatment is performed on the magnetic conductive member of the electrical machine. The vacuum pressure impregnation process (VPI) may be employed to perform varnish dripping and drying of the magnetic conductive member of the electrical machine after the varnish impregnation treatment. In the example shown in FIG. 9, the stator winding structure is axially and horizontally placed in a hot-air circulating drying room, the rotary baking process is performed to gradually solidify the liquid insulating medium. A reference numeral 900 denotes a rotating shaft.

In the stator winding structure placed as shown in FIG. 9, the slot opening of the winding slot 110 faces radially outward. For a conventional stator winding structure, in a case where the winding slot 110 is located at a 12 o'clock position, the slot opening of the winding slot 110 faces upward, and the liquid insulating medium does not easily flow out radially from the slot opening, but easily flows out axially from two ends of the winding slot 110. Further, in a case where the winding slot 110 is located at a 6 o'clock position, the liquid insulating medium easily flows out radially and axially under a force (for example, gravity, centrifugal force and the like).

For the stator winding structure in the conventional technology, since the inner wall of the winding slot 110 is relatively flat, the liquid insulating medium cannot be effectively prevented from flowing out. However, with the magnetic conductive member of the electrical machine according to the embodiment of the present application, since a large number of cavities 400 are provided on the ferromagnetic boundary of the winding slot 110, the insulating medium can be effectively prevented from flowing out. The mechanism by which the cavity prevents the liquid insulating medium from flowing out is described in detail below with reference to FIGS. 10 to 12.

Figure 10:
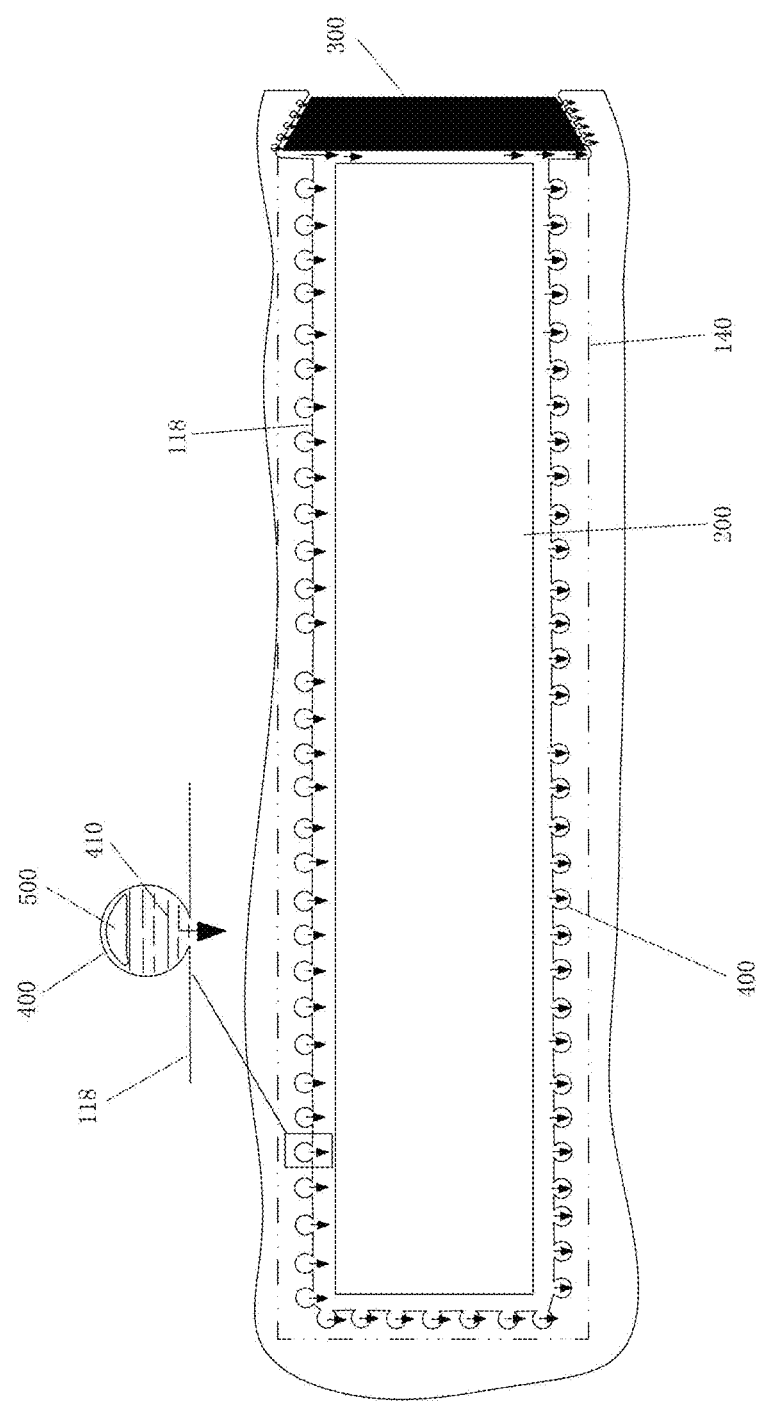
FIG. 10 shows a schematic view of the winding slot at positions of 3 o'clock or 9 o'clock in FIG. 9.

FIG. 10 shows the winding slot 110 at a 3 o'clock (or 9 o'clock) position. In this case, the winding slot 110 is in a horizontal direction, where an arrow in FIG. 10 indicates a gravity direction of the insulating medium. Since openings of cavities 400 on a lower side of the winding slot 110 face upward, the liquid insulating medium 410 in these cavities does not easily flow out. Further, since openings of cavities on an upper side of the winding slot 110 face downward, the insulating medium 410 entering into the cavities 400 tends to flow out from the cavities 400 due to the gravity. However, when the liquid insulating medium 410 in the cavities 400 sinks by force and tends to flow out, a vacuum space 500 is automatically formed on a top of each of the cavities 400. In this case, a pressure difference is formed between the vacuum space 500 and the outside atmospheric pressure, which can prevent the liquid insulating medium from sinking, thereby preventing the loss of the liquid insulating medium 410 in the cavity 400. Similarly, for cavities at a slot bottom portion and cavities at the boundary of the slot opening portion, since each of the cavities is preferably formed in a structure having a contracted opening, a vacuum space 500 is formed in the cavity when a part of the liquid in the cavity flows out, to effectively prevent the liquid insulating medium 410 from further flowing out.

Figure 11:
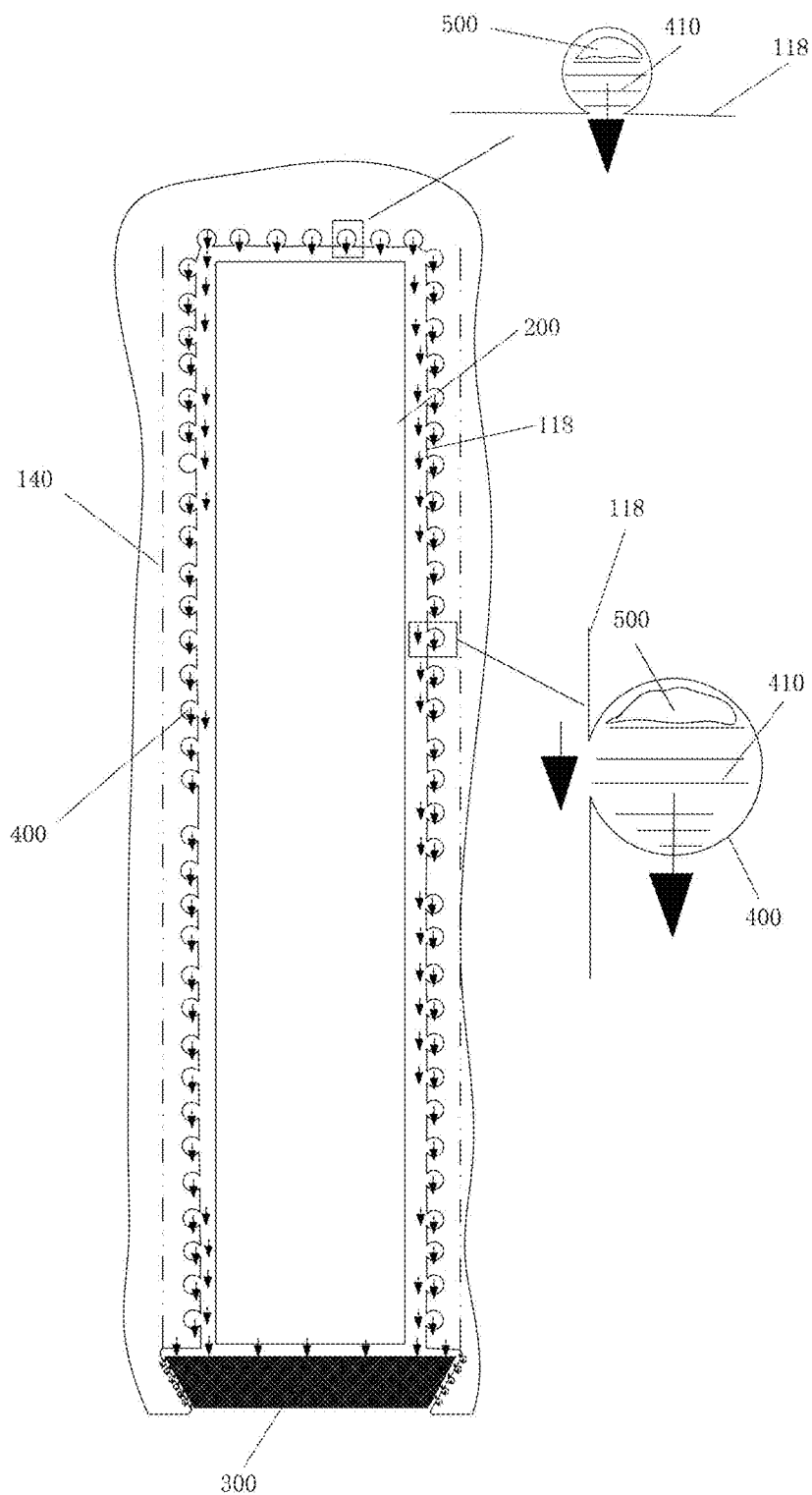
FIG. 11 shows a schematic view of the winding slot at a position of 6 o'clock in FIG. 9.

FIG. 11 shows a schematic view of the winding slot at the 6 o'clock position, where a downward arrow in FIG. 11 indicates the gravity direction of the liquid insulating medium. Similar to the action mechanism of the cavity described with reference to FIG. 10, a vacuum space 500 is formed in the cavity at the same time the liquid insulating medium 410 in the cavity flows out, to prevent the liquid insulating medium 410 from further flowing out.

In the embodiment according to the present application, the cavity 400 preferably have a structure with a large body and a small opening, and the opening of the cavity 400 is formed as a contracted opening, so that the liquid insulating medium flowing into the cavity 400 does not easily flow out. More preferably, a curved flow channel is formed at the opening of the cavity 400. By forming the flow channel of the liquid insulating medium 410 as a curved flow channel, the flow resistance coefficient can be increased to slow down the liquid flow, thus preventing the loss of the liquid insulating medium 410 in a case that the liquid insulating medium 410 has not been solidified. For example, a curved flow channel may be formed by forming a sharp protrusion structure at the opening of the cavity, to increase the flow resistance coefficient. Therefore, a large amount of liquid insulating medium is effectively retained by a large number of cavities, regardless of whether the cavities are in the inner side wall of the slot body portion or in the inner side wall of the slot opening portion.

By forming a cavity structure in the side wall of the winding slot, a large amount of liquid insulating medium can be effectively adsorbed in the varnish impregnation process, and the loss of the liquid insulating medium can be effectively prevented in the varnish dripping process.

The mechanism by which a cavity prevents the loss of the liquid insulating medium described above with reference to FIGS. 9 to 11. In addition, in the case where a large number of cavities are formed in the inner wall of the winding slot 110, the insulating medium in the cavities is bonded with the insulating medium at the ferromagnetic boundary, thereby exerting a greater effect on preventing the loss of the liquid insulating medium. After the liquid insulating medium is solidified and molded, a rooted three-dimensional bonding force network 600 that overcomes a peeling force is formed, to prevent the solidified insulating medium from splitting or peeling. The three-dimensional bonding force network 600 is described in detail below with reference to FIG. 12.

Figure 12:
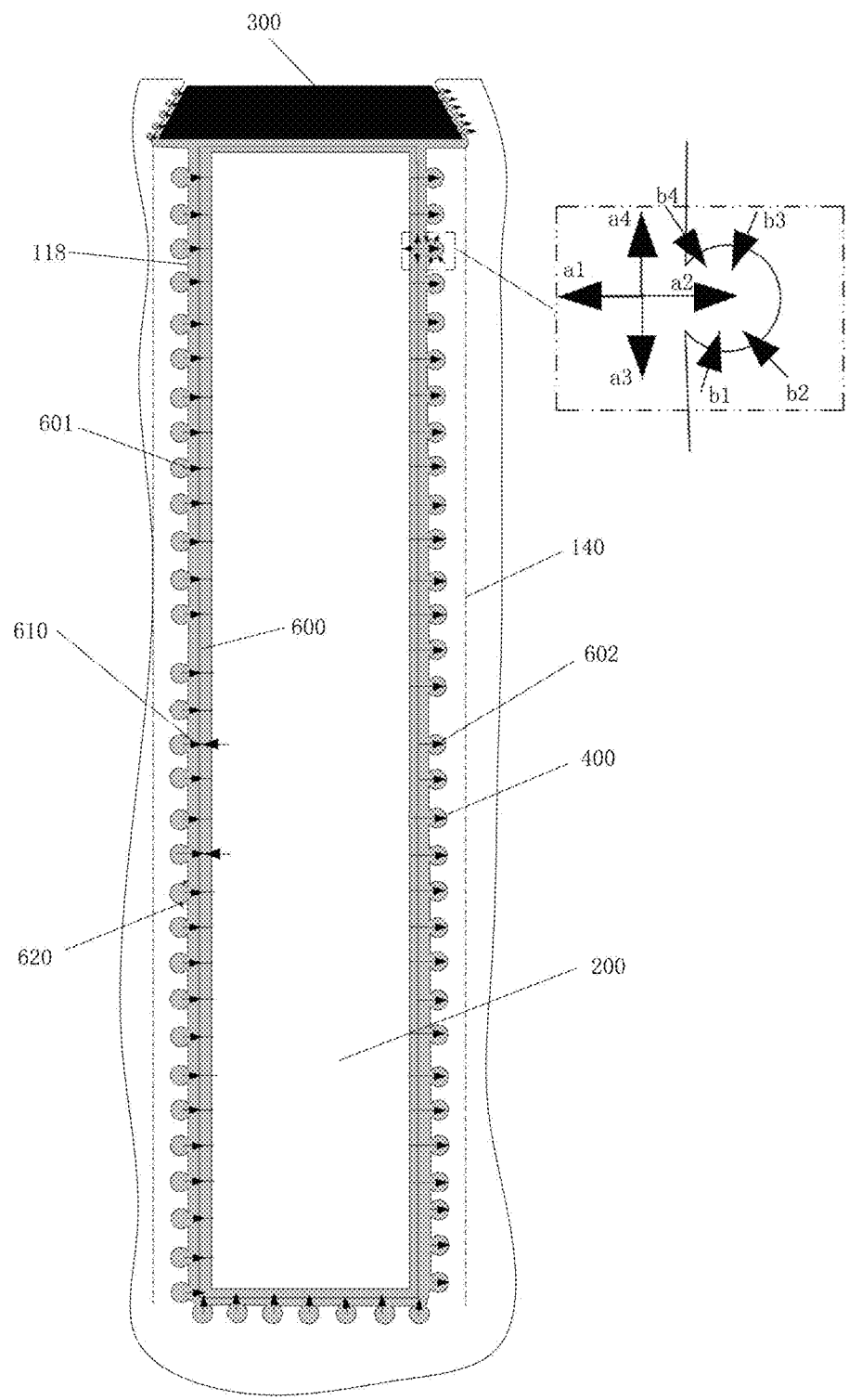
FIG. 12 shows a schematic view of a three-dimensional bonding force network formed by an insulating medium within a ferromagnetic boundary in a winding slot.

As shown in FIG. 12, during the varnish impregnation process, the gaps among the ferromagnetic lamination 100, the winding 200, and the slot wedge 300 are filled up with the liquid insulating medium due to the adsorption of the cavities 400, where the filled insulating medium is shown in grey in FIG. 12.

After being solidified, the insulating medium in the cavity is bonded with the adjacent insulating medium to form a solid coating body that is coated on the ferromagnetic boundary to form an elastic support structure, and an elastic sealing structure with a base is formed at the slot opening portion. The insulating medium in the cavity, like a sucker or a gripper, is tightly connected to the insulating medium of the integrated structure and is attached to the inner wall of the ferromagnetic boundary. In this way, a multi-layer protection system is created at junctions among the three parts including the magnetic conductive member of the electrical machine, the coil winding and the slot wedge, meanwhile, the electromagnetic characteristics of the ferromagnetic boundary of the slot wedge can be maintained.

As shown in FIG. 12, since the insulating medium in the cavities and the insulating medium at the ferromagnetic boundary are integrally connected to each other, a bonding force is formed between the insulating medium in the cavity and the insulating medium at the ferromagnetic boundary, as shown by a reference numeral 610 in FIG. 12. When the coil winding 200 contracts, the insulating medium at the ferromagnetic boundary contracts and tends to peel. In FIG. 12, the peeling force applied to the insulating medium in the cavity is indicated by a rightward arrow 601 at the opening of the cavity at a left side of the winding slot 110. However, when the insulating medium in the cavity is stretched outwardly and deformed, a resistance (which is indicated by a reference numeral 620) to the peeling is also generated at the boundary of the cavity. Therefore, the insulating medium in the cavity, like a rooted sucker, is tightly adsorbed on the inner wall of the winding slot to prevent the insulating medium from peeling off from the ferromagnetic boundary.

When the coil winding 200 is expanded, the insulating medium at the ferromagnetic boundary is squeezed, and thus the insulating medium in the cavity is squeezed. A squeezing force applied to the insulating medium is indicated by a rightward arrow 602 on the right side of the winding slot.

In this case, compared with a structure in which no cavity is formed, with the magnetic conductive member of the electrical machine according to the embodiment of the present application, a buffer space is provided due to the cavities, and the thickness of the entire insulating medium is increased, so that the insulating medium has a buffer space when being squeezed, thus avoiding the risk of the insulating medium splitting due to a limited stretch space.

In order to more easily understand the bonding force between the insulating medium in the cavity and the adjacent insulating medium, a schematic view of the force applied to the insulating medium in and around a cavity is shown at an upper right corner in FIG. 12, where arrows a1, a2, a3 and a4 indicate bonding forces in multiple directions formed by the mutual bonding between the insulating medium at the ferromagnetic boundary and the insulating medium in the cavity, and arrows b1, b2, b3 and b4 indicate resistances to the peeling generated in the cavity.

Figure 13:
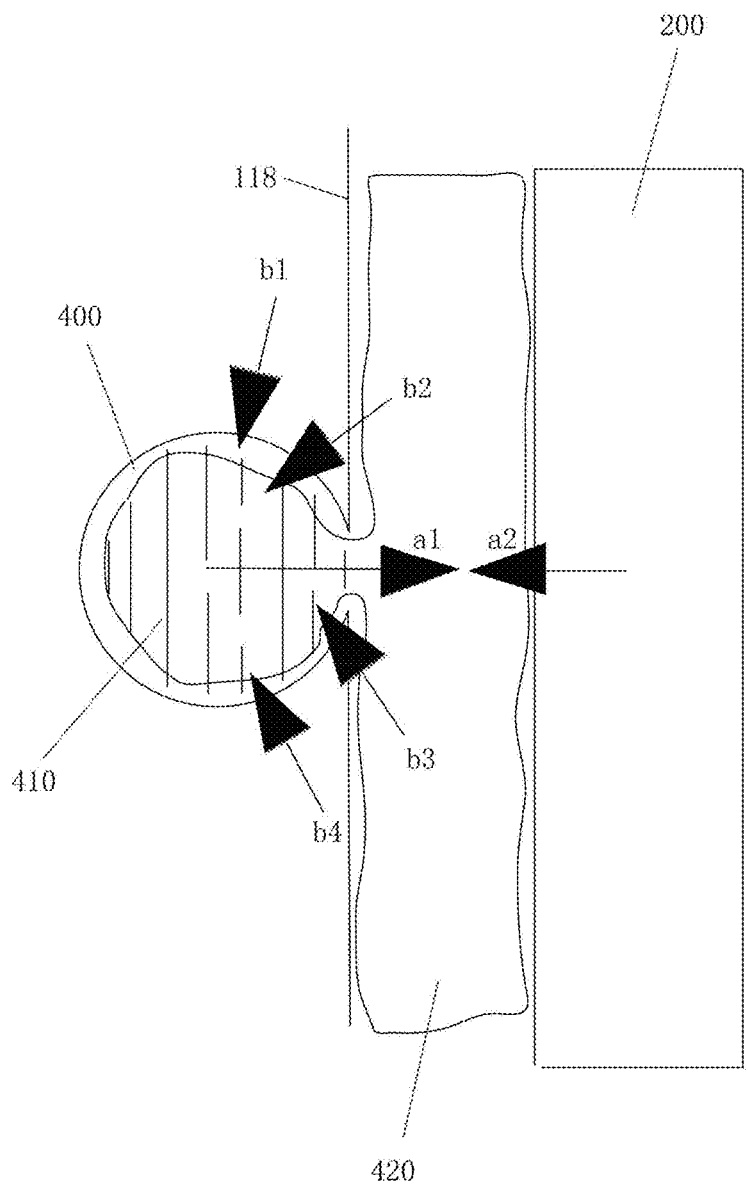
FIG. 13 shows a partial view of force analysis at a junction between the ferromagnetic boundary and the insulating medium in a cavity.

FIG. 13 is an enlarged partial view of a bonding structure between the insulating medium 410 in a cavity and the insulating medium 420 at the ferromagnetic boundary. When multiple cavities are bonded with each other to form a three-dimensional bonding force network in the entire gap, and the contraction and tension deformation of the insulating medium may also be supported. When the coil winding 200 contracts, the insulating medium 420 at the ferromagnetic boundary pulls outward the insulating medium 410 in the cavity 400, as shown by an arrow a1 in FIG. 13. The insulating medium 410 has a stretching buffer space due to the cavity 400, which is different from the conventional technology in which no cavity is formed in an inner wall of a rigid winding slot of a magnetic conductive member of the electrical machine, and resistances against the insulating medium 420 pulling outward the insulating medium 410 may be generated due to the tension deformation of the insulating medium 410 and the contracted opening of the cavity, as shown by arrows b1, b2, b3 and b4 in FIG. 13. Similarly, when the coil winding 200 expands to squeeze the insulating medium 420 (as shown by an arrow a2 in FIG. 13), the cavity 400 may provide a squeezable space. Therefore, with the cavity structure, the insulating medium in the cavity 400 can be rooted and bonded with the adjacent insulating medium to form an intermediate elastic base (bonded base), thereby supporting the tension or contraction deformation of the entire insulating layer.

Therefore, with the magnetic conductive member of the electrical machine according to the embodiment of the present application, during the varnish impregnation process, the cavity structure can easily absorb the liquid insulating medium, so that the liquid insulating medium fills up the entire gap. Further, during the varnish dripping process, with the vacuum space, a pressure difference preventing the liquid insulating medium from flowing can be automatically generated to effectively retain and fix the insulating medium, which has the dual function of preventing the radial loss and axial loss of the insulating medium, thereby solving the problem that the liquid insulating medium in the conventional magnetic conductive member flows out in the radial and axial directions of the slot wedge during the varnish dripping process, improving the fullness rate after the varnish impregnation process and the varnish dripping process, reducing the risk of erosion of the electrical machine by moisture, and improving the insulation reliability.

The insulating medium is rooted in a cavity space, and the flow resistance is generated due to a rough surface of the inner boundary of the cavity, thereby enhancing the mechanical bonding force between the impregnated insulating medium and the ferromagnetic boundary, and facilitating the wetting of a ferromagnetic boundary surface by the insulating medium. After being solidified and molded, the insulating medium in the cavity may be bonded with the adjacent solid insulating medium to form a solid coating body, thereby obtaining a better overall insulation performance, preventing the water and steam form being retained, and preventing a breathing phenomenon (which has a destructive effect). During the operation or shutdown of a wind-driven generator exposed in the natural environment, no matter whether the solidified insulating medium between a conductor and the ferromagnetic boundary is subjected to a contraction stress or a thermal stress, the stress may be released by relaxation in a case where the insulating medium in the slot and the insulating medium at the boundary of the ferromagnetic lamination have better viscoelasticity. If the peristaltic motion of the insulating medium is not sufficient to completely eliminate the internal stress, there will be a permanent residual internal stress. The internal stress competes with an adhesive force of the insulating medium and the strength of the insulating medium each other. If the internal stress is too large, the insulating medium may be damaged or fall off from the ferromagnetic boundary. According to the magnetic conductive member of the electrical machine in the present application, the formation of the vacuum space in the cavity provides a material basis for stress releasing and thermal deformation, therefore, with the viscoelasticity and the base function of the cavity. The stresses at the "bonding interface" can be recombined to maintain the bonding, so as to support tension or contraction deformation.

In summary, with the integrated insulating structure formed by the cavity structure, wind, frost, rain, snow, dust, floe, salt mist and other undesired multiphase flow impurities can be better prevented from entering the winding slot and damaging the insulating structure in the slot.

In addition, in the winding structure of the electrical machine, heat generated by an electrically conductive member (such as a winding) will cause the aging and strength decrease of polymer insulating mediums/materials, which eventually results in the failing of the insulation materials and an excessive leakage current in the magnetic conductive member. In a magnetic conductive member of the electrical machine in the conventional technology, since no cavity structure is provided, the insulating medium easily peels, which may result in the breaking of a heat conduction channel between the magnetic conductive member and the electrically conductive member, causing the interrupted heat conduction. However, according to the technical solutions of the present application, a cavity structure is provided, with the cavity, the liquid insulating medium is rooted after being solidified in the cavity, and forms an integrated structure together with the insulating medium coating the winding, which not only prevents the insulating medium from peeling off from the boundary of the magnetic conductive member, but also forms a continuous thermally conductive medium between the magnetic conductive member and the winding, so that the heat flow/heat conduction will not be interrupted, the heat generated by the winding can be transferred to the magnetic conductive member such as the silicon steel sheet, and the heat can be taken away by the magnetic conductive member, so as to control and suppress a temperature rise of winding, and absorb the heat generated by the winding.

In addition, with the integrated insulating structure, the impurities can also be prevented from entering a coupling space (fitting space) between the magnetic conductive member and the electrically conductive member, and electrical insulation and electrical energy isolation are formed between the electrically conductive member and the magnetic conductive member, which prevents the electrically conductive member from transferring electrical energy to the magnetic conductive member.

The magnetic conductive member of the electrical machine according to the present application is not limited to a stator core, and may also be a rotor that requires an insulation treatment. Further, the cavity structure according to the embodiment of the present application may be applied to other members that require a varnish impregnation treatment.

Therefore, according to an embodiment of the present application, an electrical machine having the magnetic conductive member of the electrical machine described above is further provided. According to another embodiment of the present application, a winding structure of the electrical machine after an insulation treatment and an electrical machine having the winding structure of the electrical machine are further provided.

According to an embodiment of the present application, the electrical machine described above may be a wind-driven generator. Therefore, according to an aspect of the present application, a wind turbine generator system and a wind power plant having at least one wind turbine generator system are further provided.

According to the technical solutions of the present application, the cavity structure may be applied not only to a stator and a rotor of an electrical machine, but also to other various electric energy and magnetic energy conversion devices that require an insulation treatment, a filling treatment, or a perfusion treatment, such as transformers and electric reactors. The electrical energy and magnetic energy conversion device typically includes an electrically conductive member (such as a coil) and a magnetic conductive member, and an insulator is required to be filled between the electrically conductive member and the magnetic conductive member. Therefore, multiple cavities may be formed on a boundary, corresponding to the electrically conductive member, of the magnetic conductive member, so that an insulating medium is filled in the multiple cavities and a gap between the magnetic conductive member and the electrically conductive member. After the liquid insulating medium is solidified and molded in the multiple cavities and the gap, an integrated insulating structure is formed, which can form a continuous thermally conductive medium between the electrically conductive member and the magnetic conductive member, prevent impurities from entering the coupling space (fitting space) between the magnetic conductive member and the electrically conductive member, and prevent the electrically conductive member from transferring electrical energy to the magnetic conductive member.

According to the technical idea of the present application, the cavity structure may also be applied in a blade, for example, in a blade of a wind turbine generator system. In the conventional technology, in the process of manufacturing a blade of a wind-driven generator, a skeleton of the blade of the wind-driven generator is usually firstly manufactured, and the skeleton of the blade is placed in a blade manufacturing mold, then a resin is perfused, and then the blade is formed after the resin is solidified and molded. In order to tightly bond the blade skeleton with the resin without separating from each other, a cavity structure may be formed in a surface of the blade skeleton according to the idea of the present application. Similar to the above-described cavity structure of the magnetic conductive member of the electrical machine, in the process of perfusing the liquid resin, the liquid resin is filled in the cavity in the blade skeleton and the space between the blade molds. The liquid filling medium accommodated in the cavity is solidified and molded to form a solid filling body, and the liquid filling medium tightly coated on the outer surface of the blade skeleton is solidified and molded to form a solid coating body. The solid filling bodies in multiple cavities and the solid coating body form an integrated structure and are not easily separated from each other. In addition, in a case where bolts are pre-embedded at a root portion of the blade, multiple cavities may be formed in an outer periphery of the root portion at which the bolt are pre-embedded, so that the embedded bolts and the filling resin form an integrated bonding structure. Therefore, with the blade according to the present application, when torques are applied in different directions, even when the stretching or twisting degree of the filling medium is different from that of the blade skeleton, or when the degree of thermal expansion and contraction of the filling medium is different from that of the blade skeleton due to temperature changes, the filling medium does not easily peel off from the skeleton due to an elastic base in the cavity, thereby preventing the blade structure from being damaged.

Although exemplary embodiments of the present application have been described above in detail in conjunction with the drawings, the present application is not limited thereto. Those skilled in the art should understand that these embodiments can be modified without departing from the principle and spirit of the present application.

The invention claimed is:

1. A winding structure of an electrical machine, comprising:
   a magnetic conductive member of the electrical machine, wherein the magnetic conductive member has a plurality of winding slots, wherein a plurality of ferromagnetic laminations are superposed on each other in a thickness direction, so that tooth slots, superposed in the thickness direction, of the plurality of ferromagnetic laminations form the winding slots; and
   a coil winding, comprising:
      in-slot portions arranged in the winding slots, and
      winding end portions projecting out from the winding slots,
   wherein a plurality of cavities in communication with an accommodating space of each of the winding slots are formed in an inner wall of the winding slot, and a filling medium is filled in the plurality of cavities and between the winding slot and the coil winding, wherein a plurality of grooves are provided on a ferromagnetic boundary, where a tooth slot is formed, of a ferromagnetic lamination, each of the grooves has an opening in the thickness direction of the ferromagnetic lamination and an opening in communication with the tooth slot, and the opening in the thickness direction is blocked by portions, having no grooves, of an adjacent superposed ferromagnetic laminations, to form the cavity,
   wherein a vacuum space is formed between an inner wall of the cavity and the filling medium.

2. The winding structure of the electrical machine according to claim 1, wherein each of the cavities has a contracted opening.

3. The winding structure of the electrical machine according to claim 2, further comprising:
   a slot wedge provided at a slot opening of each of the winding slots, wherein the filling medium is filled among the magnetic conductive member of the electrical machine, the slot wedge, and the coil winding, and the filling medium forms an integrated structure.

4. The winding structure of the electrical machine according to claim 3, wherein the integrated structure comprises:
   a coating body coated on the inner wall of the winding slot; and
   a sealing structure formed on an outer periphery of the slot wedge.

5. The winding structure of the electrical machine according to claim 3, wherein the cavity does not exceed an outermost edge of the slot opening in a width direction of the winding slot.

6. The winding structure of the electrical machine according to claim 1, wherein the magnetic conductive member of the electrical machine is a stator core or a rotor core, and the filling medium is an insulating medium.

7. The winding structure of the electrical machine according to claim 1, wherein each of the cavities has at least one of the following structural features:
   the cavity has a contracted opening;

a rough structure or a curved structure is formed on an edge at an inner side of the cavity;

a sharp protrusion is formed at an opening of the cavity; and a size of the cavity gradually increases, and a size of the opening of the cavity decreases in a direction from a slot bottom of the winding slot towards a slot opening of the winding slot.

8. The winding structure of the electrical machine according to claim 1, wherein:

the plurality of ferromagnetic laminations superposed on each other, wherein each of the cavities is formed in a respective layer of ferromagnetic lamination, and the plurality of cavities are formed in odd layers of ferromagnetic laminations and/or even layers of ferromagnetic laminations; or each of the cavities is formed in at least two adjacent layers of ferromagnetic laminations.

9. The winding structure of the electrical machine according to claim 8, wherein the plurality of grooves are arranged along the entire ferromagnetic boundary or a part of the ferromagnetic boundary, the tooth slot comprises a slot body portion and a slot opening portion, wherein in a width direction of the tooth slot, the grooves formed at the ferromagnetic boundary corresponding to the slot body portion does not exceed an outermost edge of an accommodating space of the slot opening portion.

10. The winding structure of the electrical machine according to claim 8, wherein a plurality of grooves are provided at a ferromagnetic boundary, where a tooth slot is formed, of the ferromagnetic lamination, and the plurality of grooves are in communication with the tooth slot, wherein the tooth slot comprises a slot body portion and a slot opening portion, and the grooves are formed at the ferromagnetic boundary corresponding to the slot body portion and/or the ferromagnetic boundary corresponding to the slot opening portion.

11. The winding structure of the electrical machine according to claim 10, wherein the plurality of grooves are arranged along the entire ferromagnetic boundary or a part of the ferromagnetic boundary.

12. The winding structure of the electrical machine according to claim 10, wherein in a width direction of the tooth slot, the grooves formed at the ferromagnetic boundary corresponding to the slot body portion does not exceed an outermost edge of the slot opening portion.

13. An electrical machine, comprising a rotor, and a winding structure of the electrical machine, wherein, the winding structure of the electrical machine comprises:

a magnetic conductive member of the electrical machine, wherein the magnetic conductive member has a plurality of winding slots, wherein a plurality of ferromagnetic laminations are superposed on each other in a thickness direction, so that tooth slots, superposed in the thickness direction, of the plurality of ferromagnetic laminations form the winding slots; and a coil winding, comprising:

in-slot portions arranged in the winding slots, and winding end portions projecting out from the winding slots, wherein a plurality of cavities in communication with an accommodating space of each of the winding slots are formed in an inner wall of the winding slot, and a filling medium is filled in the plurality of cavities and between the winding slot and the coil winding, wherein a plurality of grooves are provided on a ferromagnetic boundary, where a tooth slot is formed, of a ferromagnetic lamination, each of the grooves has an opening in a thickness direction of the ferromagnetic lamination and an opening in communication with the tooth slot, and the opening in the thickness direction is blocked by portions, having no grooves, of an adjacent superposed ferromagnetic laminations, to form the cavity, wherein a vacuum space is formed between an inner wall of the cavity and the filling medium.

14. An electric energy and magnetic energy conversion device, comprising:

a magnetic conductive member, an electrically conductive member arranged on the magnetic conductive member, and an insulator formed between the magnetic conductive member and the electrically conductive member; wherein a plurality of cavities are formed on a boundary, corresponding to the electrically conductive member, of the magnetic conductive member and the insulator is filled in both the plurality of cavities and a gap between the electrically conductive member and the magnetic conductive member other than the plurality of cavities, wherein a plurality of grooves are provided on a ferromagnetic boundary, where a tooth slot is formed, of a ferromagnetic lamination, each of the grooves has an opening in the thickness direction of the ferromagnetic lamination and an opening in communication with the tooth slot, and the opening in the thickness direction is blocked by portions, having no grooves, of an adjacent superposed ferromagnetic laminations, to form the cavity, wherein a vacuum space is formed between an inner wall of the cavity and the insulator.

15. The electric energy and magnetic energy conversion device according to claim 14, wherein the insulator forms an integrated insulating structure after being solidified and molded in the plurality of cavities and the gap, and the integrated insulating structure has at least one of the following structural features:

the integrated insulating structure forms a continuous thermally conductive medium between the electrically conductive member and the magnetic conductive member;

the integrated insulating structure is configured to prevent impurities from entering a coupling space between the magnetic conductive member and the electrically conductive member; and the integrated insulating structure is configured to prevent the electrically conductive member from transferring electric energy to the magnetic conductive member.

16. The electric energy and magnetic energy conversion device according to claim 15, wherein the electric energy and magnetic energy conversion device is an electrical machine, a transformer or an electric reactor.

* * * * *